United States Patent [19]
Cronce et al.

[11] Patent Number: 6,050,466
[45] Date of Patent: *Apr. 18, 2000

[54] ARTICLE CARRIER HAVING CROSS MEMBER WITH ROLLERS

[75] Inventors: Gary M. Cronce, Port Huron; Craig A. Stapleton, Clarkston, both of Mich.

[73] Assignee: Advanced Accessory Systems LLC, Sterling Heights, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/810,563

[22] Filed: Mar. 3, 1997

[51] Int. Cl.$^7$ ................................................ B60R 9/045
[52] U.S. Cl. ................................. 224/321; 224/326
[58] Field of Search ..................... 224/321, 325, 224/326, 309, 310

[56] References Cited

U.S. PATENT DOCUMENTS

| | | | |
|---|---|---|---|
| 3,545,660 | 12/1970 | Stephen | 224/321 |
| 5,172,952 | 12/1992 | Lasnetshi | 224/310 |
| 5,232,138 | 8/1993 | Cucheran | 224/321 |
| 5,385,285 | 1/1995 | Cucheran et al. | 224/321 |
| 5,553,761 | 9/1996 | Audoire et al. | 224/321 |
| 5,588,572 | 12/1996 | Cronce et al. | 224/321 |

FOREIGN PATENT DOCUMENTS

WO94/10007  5/1994  WIPO .................................. 224/321

Primary Examiner—Linda J. Sholl
Attorney, Agent, or Firm—Rader, Fishman & Grauer PLLC

[57] ABSTRACT

An article carrier includes a cross member rollingly engaging a pair of longitudinally extending side rails. The cross member has rollers that engage the side rails for reducing the amount of effort required to move the cross member along the side rails. A cross member lock mechanism is also disclosed having three distinct modes of operation: automatically re-locking, manually re-locking, and locked.

30 Claims, 3 Drawing Sheets

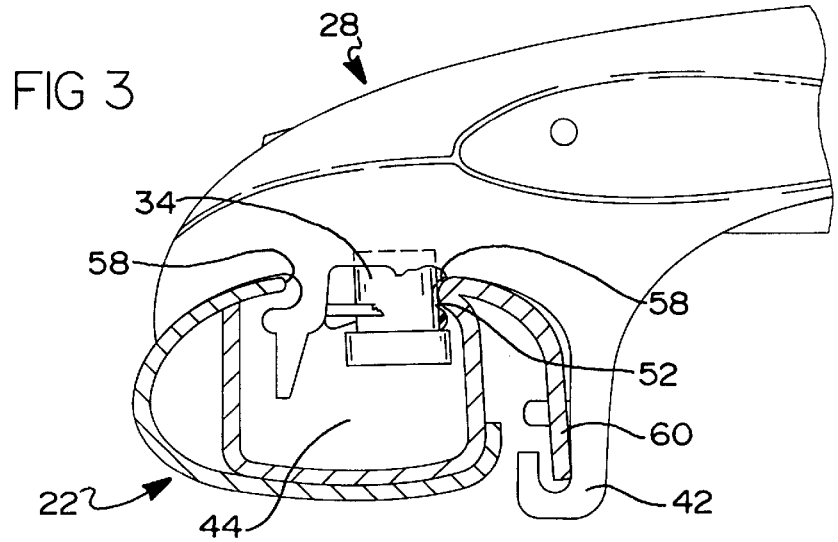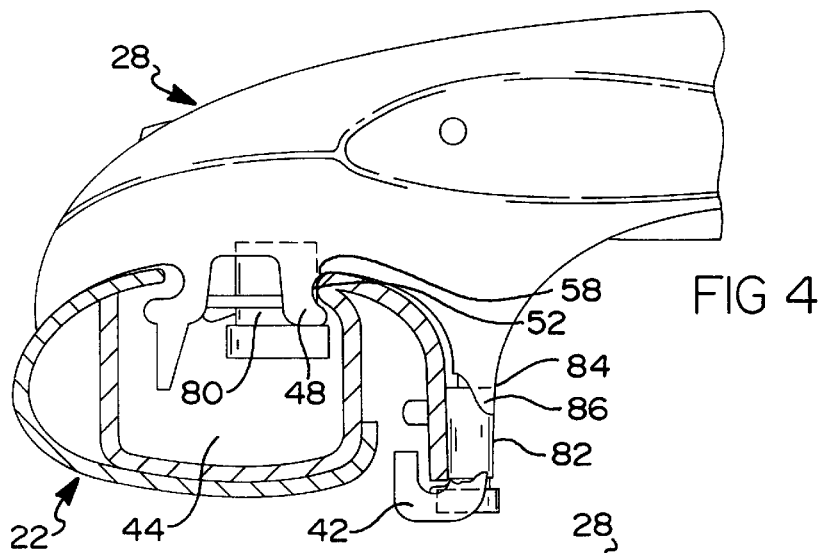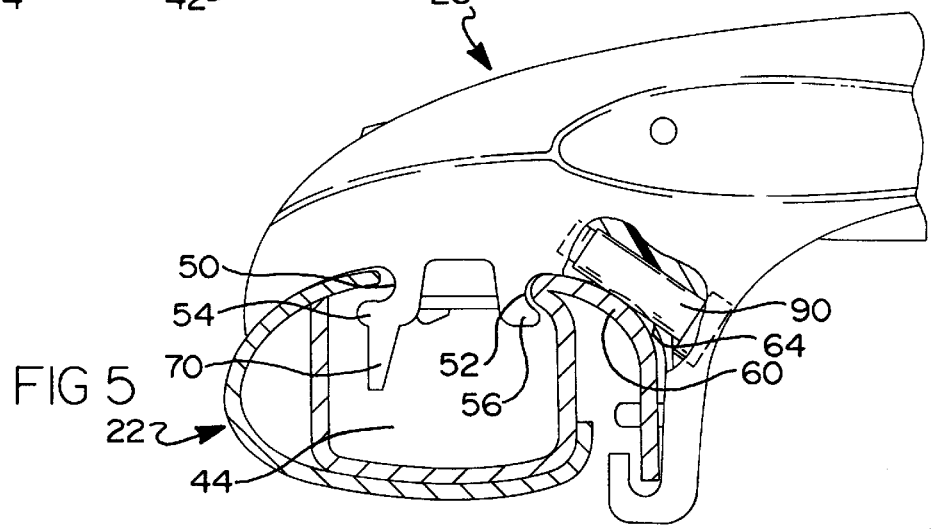

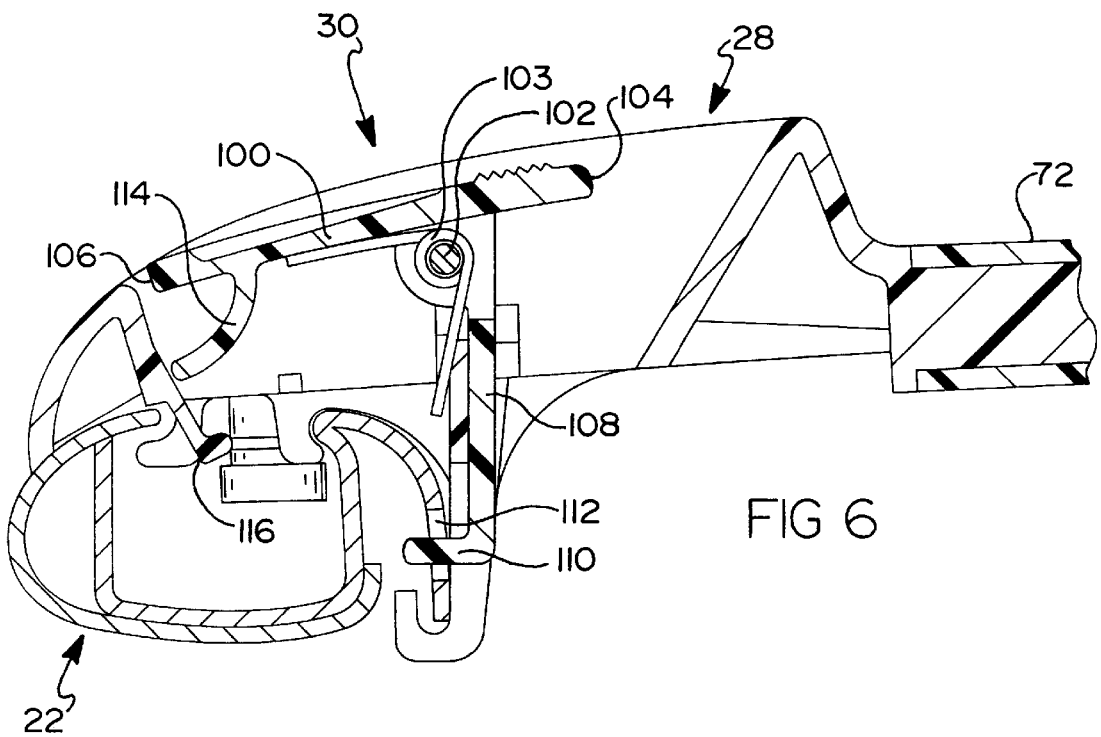
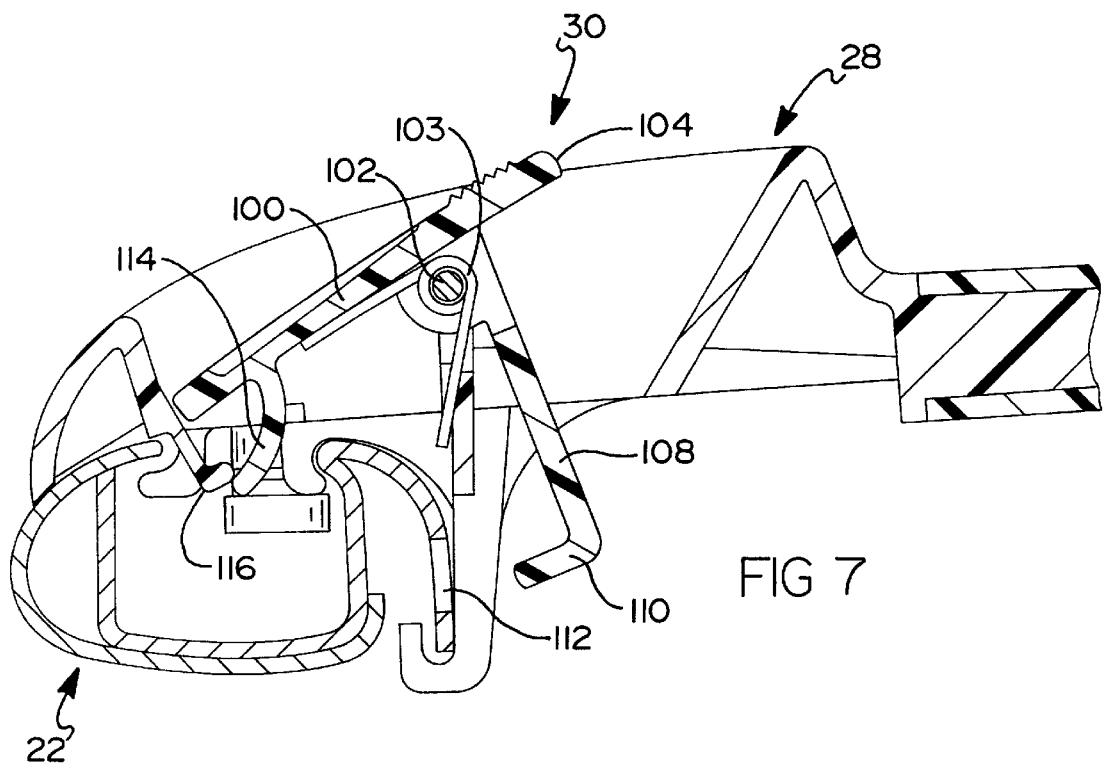

ARTICLE CARRIER HAVING CROSS MEMBER WITH ROLLERS

FIELD OF THE INVENTION

The present invention relates to article carrier devices for vehicles and, in particular, to luggage racks located for example, on a roof of a vehicle. The luggage rack of the present invention includes a pair of side rails mounted to a vehicle for accommodating at least one adjustable cross member which is rollingly supported on the side rails. The cross member moves along the side rails in a longitudinal direction of travel and can be selectively locked to prevent cross member movement relative to the side rails.

BACKGROUND OF THE INVENTION

Luggage racks are known in the prior art. Luggage racks are commonly affixed to the roofs or trunk lids of automobiles including sedans, vans, station wagons, sport utility vehicles, and trucks. Some known luggage racks have immovable cross members rigidly connected to side support members. These luggage racks are less desirable for certain article accommodation because the cross members cannot be moved to optimize support of the article.

Other known luggage racks have cross members which are movable relative to the side supports. Spacing between cross members can be adjusted to optimize support of cargo having different sizes and different shapes. However, prior art luggage racks featuring adjustable cross members still have certain drawbacks. For example, cross member adjustment is difficult because the cross member has stationary surfaces sliding against the side supports. Such sliding designs have increased frictional resistance which prevents smooth, easy adjustment and therefore, is not desirable to consumers. Also, the locking arrangement for the known cross members make it difficult for a single operator to easily adjust the cross member. Conventional luggage racks require either two operators to efficiently adjust the cross members or one operator to travel back and forth from one side of the vehicle to the other side to make a change in cross member spacing.

SUMMARY OF THE INVENTION

The present invention is directed to an article carrier for use on vehicles having a cross member rollingly supported on a pair of side rails by at least one roller element. The article carrier of the present invention has reduced friction during movement because of rolling engagement and therefore less effort is needed to adjust the cross member longitudinally along the side rails. The roller element also reduces binding of the cross member which would otherwise prevent proper movement.

The present invention includes an aerodynamic cross member having end brackets at least one of which carries a roller. The end brackets also have first and second guide elements for maintaining proper alignment of the cross member relative to the side rails. The first and second guide elements interlock the end brackets to the side rails such that only longitudinal movement is permitted between the cross member and side rails.

Cargo is further accommodated on the present article carrier by tie down securing portions located on the cross member end brackets for accepting cargo securing devices such as rope or elastic cords having hooks at their ends.

A further feature of the present invention is a cross member locking device which allows a single operator to efficiently move a cross member along the side rails while standing on a single side of a vehicle. The locking device provides three select modes of operation, automatically re-locking, manually re-locking, and locked.

Therefore, the present invention reduces frustration of the operator by reducing the effort required to adjust the cross member longitudinally along the side rails and by reducing the tedious nature of the prior art locking mechanisms. The present article carrier invention increases operator efficiency and improves consumer satisfaction.

BRIEF DESCRIPTION OF THE DRAWINGS

The features and inventive aspects of the present invention will become more apparent upon reading the following detailed description, claims, and drawings, of which the following is a brief description:

FIG. 3 is a cross-sectional view of an end bracket having a roller contacting a rail surface according to one embodiment of the present invention.

FIG. 4 is a cross-sectional view of an end bracket having a pair of rollers laterally spaced apart in accordance with a second embodiment.

FIG. 5 is a cross-sectional view of an end bracket having an angled roller contacting a side rail in accordance with the present invention.

FIG. 6 is a cross-sectional view of an end bracket on a side rail as seen in FIG. 1, in a locked position.

FIG. 7 is a cross-sectional view of an end bracket on a side rail as seen in FIG. 1, in a fully unlocked position requiring manual re-locking.

DETAILED DESCRIPTION OF PREFERRED EMBODIMENTS

Figure 1:
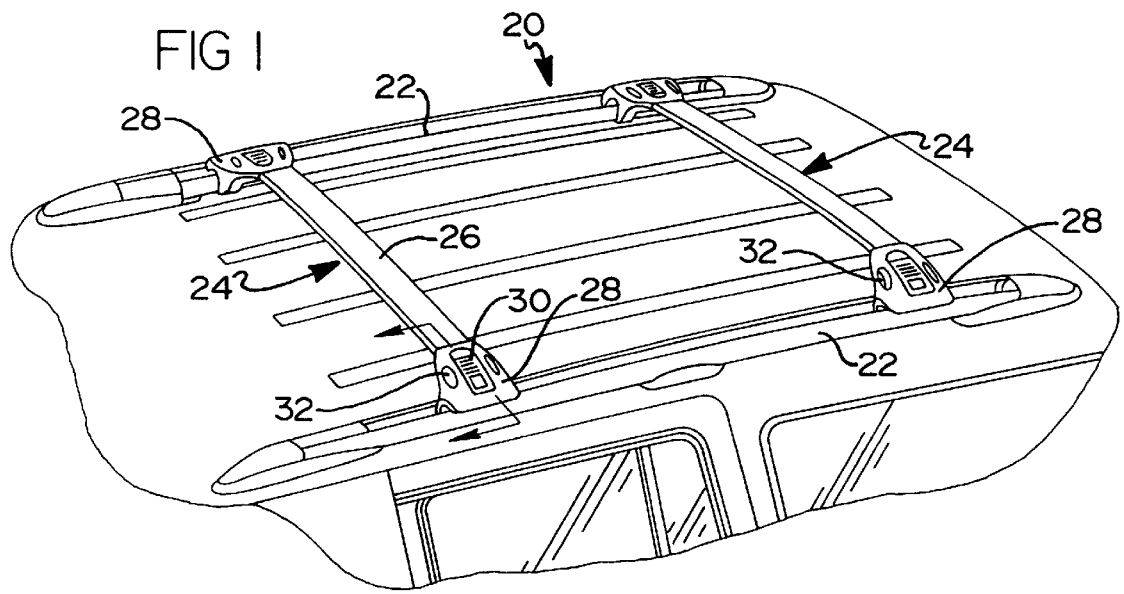
FIG. 1 is perspective view of an adjustable article carrier according to the present invention.

FIG. 1 shows an adjustable roof rack 20 mounted on a vehicle according to the instant invention. Roof rack 20 includes a pair of longitudinally extending side rails 22 and cross members 24 which are rollingly supported on the side rails 22. Cross member 24 includes an elongated main body 26 having end brackets 28 attached at each end of main body 26. End brackets 28 are designed to rollingly engage side rails 22. In addition, at least one of the end brackets 28 has a lock mechanism 30 to selectively maintain cross member 24 in a desired position. There are openings 32 provided on cross member 24 designed to receive cargo securing devices, for example, ropes, belts, or elastic cords with hooks.

Figure 2:
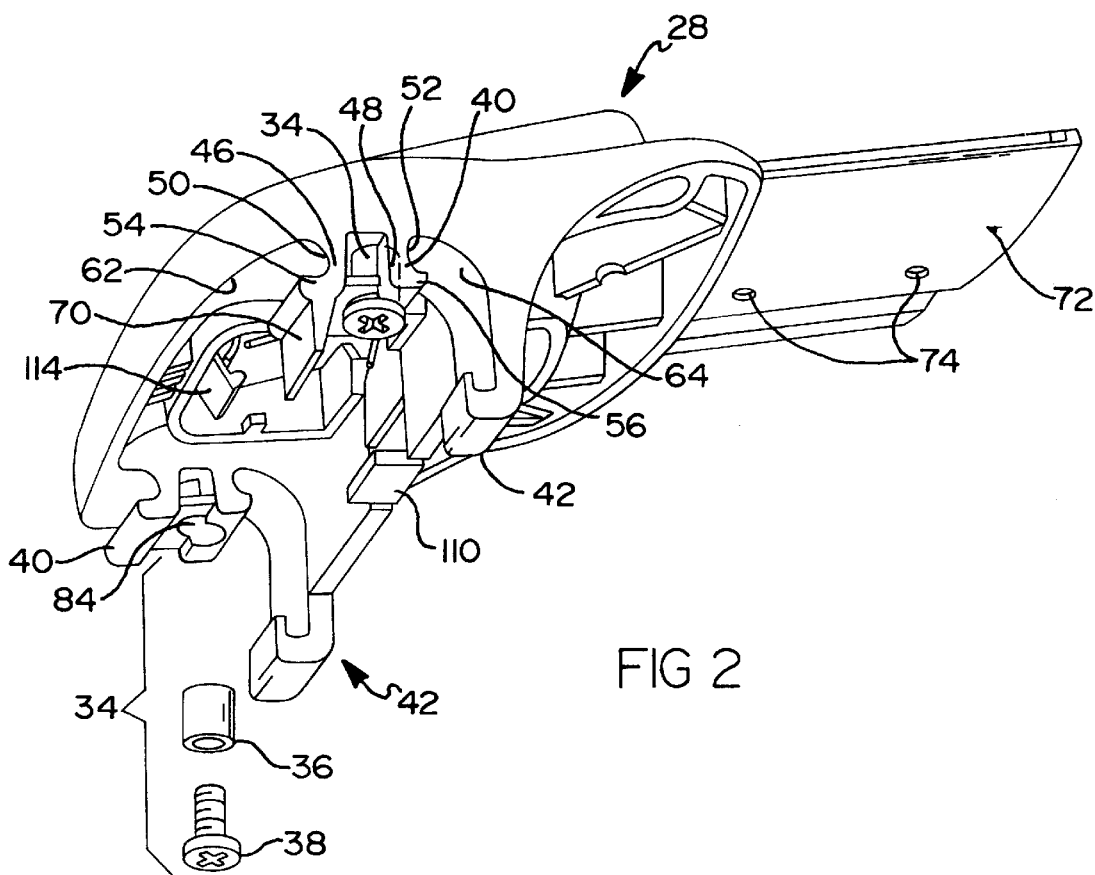
FIG. 2 is a perspective view of an end bracket according to the present invention.

An example of an end bracket 28 according to the present invention is illustrated in FIG. 2 and FIG. 3. End bracket 28 has longitudinally spaced apart rollers 34 designed to rollingly engage a corresponding side rail 22. Rollers 34 comprise roller sleeves 36 mounted to end bracket 28 using a fastener 38. However, other roller devices can be used, including but not limited to, ball bearings, wheels or solid cylindrical rollers. In addition, other fastening devices are contemplated to be used, such as an integral axle, a friction fit pin, a cage, or a recess to receive and retain the roller. End brackets 28 are selectively provided with upper and lower guide elements 40, 42.

Upper guide elements 40 are located in an upper portion of end bracket 28 and are designed to operate in a channel 44 of side rail 22. Upper guide elements 40 properly align the corresponding end bracket 28 during movement. Preferably, guide elements 40 have first and second L-shaped legs 46,48 defining guide grooves 50,52. First leg 46 has a foot portion 54 that is longer than foot portion 56 on leg 48 to receive inwardly projecting channel wall guides 58 in an interlocking manner so as to limit movement of the end bracket relative to the side rail 22 in both the lateral and vertical directions.

Lower guide elements 42 are spaced downwardly away from the upper portion of end bracket 28 and are designed to receive a lower portion of side rail 22. Preferably, lower guide elements 42 have a hook or J-shape which receives a laterally projecting guide rail 60 located on side rail 22. The J-shape acts in concert with the upper portion of end bracket 28 to interlock end bracket 28 onto side rail 22 such that only longitudinal movement is permitted.

Curved segments 62,64 are provided on either side of L-shaped legs 46,48 and are shaped to correspond with mating portions on side rail 22. Curved segment 64 connects upper guide 40 with lower guide 42.

Orienting element 70 is provided on cross member 24 to ensure proper orientation of cross member 24 onto vehicle 22. If not properly oriented, aerodynamic drag will increase resulting in wind noise and reduced fuel efficiency. Preferably orienting element 70 is provided as a downward projection connected to one of the upper guides 40. Orienting element 70 interferes with an obstruction (not shown) at the end of side rails 22 such that the cross member 24 can only be assembled onto side rails 22 in the proper orientation.

End brackets 28 also include attachment portions 72 extending generally perpendicularly to the direction of travel. Securing elements 74 are provided on attachment portion 72 and are used to fixedly connect end bracket 28 to one end of cross member 24 using a suitable fastening system. Preferably, end bracket 28 is manufactured as an integral, one-piece member to reduce assembly and inventory costs.

Next, examples of roller placement will be described with reference to FIGS. 3–5. Roller placement is important in reducing friction and providing economical assembly of rollers 34 with cross members 24. FIG. 3 shows one embodiment of the present invention wherein at least one roller 34 is mounted to the upper portion of end bracket 28 and rotates about a generally vertical axis. Roller 34 extends into side rail channel 44 and rolling engages one of the channel wall guides 58. As illustrated, end bracket 28 is preferably designed to extend laterally over a majority of a cross-section of side rail 22 so as to cover channel 44. End bracket 28 conforms generally with the upper contour of side rail 22.

Side rail 22 is preferably a one-piece roll formed rail wherein lateral guide rail 60 has a degree of resiliency or springiness which tends to act laterally against lower guide element 42. The spring force tends to maintain contact of roller 34 against channel wall guide 58. In this embodiment, roller 34 is subjected to predominately side loads caused, for example, by skewing of the cross member during movement. Preferably, a pair of rollers 34 are longitudinally spaced apart with respect to the direction of travel to reduce hinging and binding during movement. Roller 34 is preferably mounted adjacent to, and partially within, second L-shaped leg 48 such that roller 34 extends into guide groove 52. Thus, roller 34 is able to rollingly contact channel wall guide 58.

FIG. 4 shows another roller positioning option according to the present invention. The illustrated end bracket 28 has at least one and preferably two pairs of rollers laterally spaced apart with respect to the direction of travel. Outer roller 80 is disposed in channel 44 like roller 34 as described above. A second inner roller 82 is laterally spaced away from outer roller 80 and rollingly engages projecting guide rail 60. Preferably, inner roller 82 is mounted adjacent to the J-shaped lower guide element 42 for maximum rolling guidance. In particular, inner roller 82 is mounted inside an opening 84 in a shank portion 86 of J-shaped lower guide element 42. Outer and inner rollers 80,82 have generally parallel axes of rotation. Thus, the embodiment in FIG. 4 preferably has four rollers 80,82 operating in pairs to further reduce friction during adjustment of cross member 24 along side rails 22. Other roller mounting arrangements, however, are within the scope of the present invention. For example, any number of rollers may be utilized not just pairs of rollers. Also, the rollers can be mounted in different areas spaced from the guide elements.

In a third embodiment, as shown in FIG. 5, at least one roller 90 is mounted on end bracket 28 at an angle to the horizontal. In the illustrated example, roller 90 is located to contact an upper portion 92 of projecting guide rail 60. It can be seen that angled roller 90 is subjected to both vertical loads and horizontal loads. Therefore, both horizontal and vertical loading of cross member 24 can be accommodated by roller 90 to ensure smooth travel of cross member 24. Preferably, roller 90 is operatively mounted within curved segment 64 at an acute angle with respect to the horizontal axis to accommodate different load conditions. At least a portion of roller 90 contacts side rail 22.

FIGS. 6 and 7 illustrate the operation of lock mechanism 30. Lock mechanism 30 includes lock actuating lever 100 which pivots about pivot pin 102 and is biased to a locked position as shown in FIG. 6 by a spring 103. Biasing lock mechanism 30 toward a locked position increases safety and helps prevent unwanted movement of cross member 24. Pivot pin 102 extends generally parallel to side rail 22 and is located closer to a first end 104 of lever 100 than a second end 106. Actuating lever 100 further includes a lock leg 108 having a projection 110 at one end thereof designed to cooperate with an opening 112 in side rail 22 to selectively prevent movement of cross member 24 along side rails 22. Lock leg 108 is also located closer to the first end 104 than second end 106.

As shown in FIG. 7, when actuating lever 100 is fully depressed, lock leg 108 is pivoted counterclockwise such that lock projection 110 disengages from side rail opening 112. A projecting arm 114 arcuately extends from an underside of actuating lever 100 and is located closer to second end 106 than first end 104. A resilient stop 116 provided on end bracket 28 projects into the path of travel of the projecting arm 114 and interferes with full travel of lever 100. Once sufficient force is applied to lever 100 for further pivoting, resilient stop 116 temporarily flexes away from projecting arm 114 allowing projecting arm 114 to pass. Resilient stop 116 then resiliently snaps back into position and prevents reverse movement of actuating lever 100 as shown in FIG. 7. Spring 103 has less return force than required to overcome the interference of resilient stop 116, therefore, lock mechanism 30 remains in a fully unlocked position. In the fully unlocked position, cross member 24 can be freely adjusted along side rails 22 without any stoppage. Also, since it is not necessary to apply any force to keep the actuating lever 100 in a fully unlocked position, an operator can stand on a single side of the vehicle and move cross member 24. In order to change from the fully unlocked position, an operator must provide sufficient force near lever end 104 to cause resilient stop 116 to flex so actuating lever 100 can pivot clockwise toward a locked position.

It should be noted that actuating lever 100 can be pivoted to an intermediate position that provides for automatic re-locking of cross member 24. The automatic re-locking position is achieved when actuating lever 100 is pivoted a sufficient distance such that lock projection 110 disengages side rail opening 112 but not enough pivoting as to flex resilient stop 116. Such a position is achieved for example upon initial abutment of projecting arm 114 against resilient stop 116. If an operator depresses lever 100 until arm 114 abuts resilient stop 116 and just slightly moves cross member 24 relative to side rail 22, then lever 100 can be released such that lock projection 110 is biased against side rail 22 but is offset from opening 112. Upon further travel along side rail 22, lock projection 110 will encounter another opening 112 spaced longitudinally along side rail 22. Upon alignment with another opening 112, lock projection 110 will be inserted into the opening 112 by the biasing force of spring 103. In this manner, automatic re-locking is achieved.

Fully unlocked operation is desired when moving a cross member 24 past a number of openings 112 spaced longitudinally along side rail 22. Automatic re-locking is desired when moving cross member 24 from one opening 112 to an immediately adjacent opening. Automatic re-locking is also useful after cross member 24 has been adjusted using the fully unlocked position because automatic re-locking helps the operator easily find the nearest opening 112 corresponding to the desired cross member location.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. An adjustable article carrier for use on vehicles, said article carrier comprising:

longitudinally extending side rails for mounting on said vehicle, each of said side rails having a longitudinal channel;

at least one cross member rollingly supported on said side rails by a first roller, said cross member including an end bracket having an upper guide and a lower guide, wherein said cross member extends substantially along a horizontal axis;

said first roller being located in said upper guide and said upper guide being received in said longitudinal channel for rollingly engaging one of said side rails to facilitate movement of said cross member along said side rails in a longitudinal direction of travel;

said first roller rotating about an axis that is positioned substantially perpendicular to said horizontal axis;

said lower guide operatively cooperating with said one of said side rails at a location spaced away from and exterior to said channel; and a locking device associated with said cross member for selectively preventing cross member movement relative to said side rails.

2. The article carrier of claim 1, wherein said first roller axis is substantially vertical.

3. The article carrier of claim 1, wherein said cross member includes a second roller spaced laterally away from said first roller with respect to the direction of travel, for reducing friction during travel.

4. The article carrier of claim 1, wherein said lower guide is spaced away from said upper guide, each of said upper and lower guides interlocking with one of said side rails for allowing cross member movement in only the longitudinal direction.

5. The article carrier of claim 4, wherein said lower guide has a J-shape and receives a lower portion of one of said side rails.

6. The article carrier of claim 1, wherein said bracket has a connecting portion for attaching said bracket to an end of said cross member.

7. The article carrier of claim 1, wherein said end bracket includes at least one portion for accommodating cargo securing devices.

8. The article carrier of claim 7, wherein said at least one portion of said end bracket is an opening.

9. The article carrier of claim 1, wherein said cross member further comprises an orienting element including a downwardly projecting portion for ensuring proper assembly of the cross member.

10. The article carrier of claim 1, wherein said side rails include a laterally projecting guide rail which provides a biasing force against said lower guide to help maintain said first roller in contact with one of said side rails.

11. The article carrier of claim 10, wherein said side rails have a predetermined portion designed to receive a locking mechanism for preventing longitudinal movement of said cross member relative to said side rails.

12. A cross member for use in an article carrier, said cross member comprising:

an elongated main body;

at least one end bracket attached to one end of said elongated main body, said bracket having an upper guide and a J-shaped lower guide;

said J-shaped lower guide including a shank portion;

a first roller located in said shank portion adapted for rollingly engaging a side rail to facilitate movement of said cross member in a desired direction of travel; and a locking device associated with said cross member adapted for selectively preventing cross member movement relative to a pair of side rails.

13. The cross member of claim 12, wherein said first roller rotates about an axis that is positioned at an angle relative to a horizontal axis.

14. The cross member of claim 13, wherein said first roller axis is substantially vertical.

15. The cross member of claim 12, wherein said at least one end bracket further includes a second roller spaced laterally away from said first roller with respect to the direction of travel, for reducing friction during travel.

16. The cross member of claim 15, wherein said upper guide further includes an L-shaped leg and said second roller is at least partially within said L-shaped leg.

17. The cross member of claim 12, wherein each of said upper and lower guides is adapted to interlock said bracket with a side rail and allow cross member movement in only the direction of travel.

18. The cross member of claim 17, wherein said lower guide is adapted to receive a lower portion of a side rail.

19. The cross member of claim 12, wherein upper guide has a pair of L-shaped legs for limiting movement in both lateral and vertical directions with respect to the direction of travel.

20. The cross member of claim 12, wherein said bracket has a connecting portion for attaching said bracket to an end of said cross member.

21. The cross member of claim 12, wherein said end bracket includes at least one portion for accommodating cargo securing devices.

22. The cross member of claim 21, wherein said at least one portion of said end bracket is an opening.

23. The cross member of claim 12, wherein said bracket further comprises an orienting element including a downwardly projecting portion for ensuring proper assembly of said cross member.

24. The cross member of claim 12, further comprising a lock mechanism having three operative positions including a first unlocked position for allowing automatic re-locking, a second unlocked position for allowing manual re-locking, and a locked position.

25. The cross member of claim 24, wherein said locking mechanism further comprises:

a lock actuating lever pivotally attached to said bracket;

a locking leg attached to said actuating lever at a first end of said leg and having a projection proximate a second end of said leg;

a spring located between said actuating lever and said cross member for biasing said actuating lever and said locking leg toward said locked position; and a stop adjacent said actuating lever defining a limit of travel for said actuating lever while in said first unlocked position.

26. An adjustable cargo restraint system for use on vehicles, said restraint system comprising:

longitudinally extending side rails;

at least one cross member rollingly supported on said side rails and being capable of movement along said side rails, said movement defining a longitudinal axis of travel;

said cross member having at least one end bracket mounted thereon for engaging one of said longitudinally extending side rails;

a first roller directly mounted to said end bracket at a predetermined location;

a second roller directly mounted to said end bracket and spaced laterally away from said first roller, such that said first and second roller define a line extending between said first and second roller, said line forming an oblique angle with said longitudinal axis of travel and wherein said first and second rollers have generally parallel axes of rotation; and at least one locking mechanism attached to said cross member.

27. The adjustable cargo restraint system of claim 26, wherein said locking mechanism has three operative positions including a first unlocked position for allowing automatic re-locking, a second unlocked position for allowing manual re-locking, and a locked position and said side rails include a pre-selected portion designed to cooperate with said locking mechanism for preventing longitudinal movement of said cross member relative to said side rails.

28. The adjustable cargo restraint system of claim 27, wherein said locking mechanism further comprises:

a lock actuating lever pivotally attached to said bracket;

a locking leg attached to said actuating lever at a first end of said leg and having a projection proximate a second end of said leg for inserting into said pre-selected portion of said side rails;

a spring located between said actuating lever and said cross member for biasing said actuating lever and said locking leg toward said locked position; and a stop adjacent said actuating lever defining a limit of travel for said actuating lever while in said first unlocked position.

29. The adjustable cargo restraint system of claim 28, wherein said stop is resilient and flexes to allow further pivoting of said actuating lever to said second unlocked position, said resilient stop preventing said spring from biasing said actuating lever to said locked position.

30. The adjustable cargo restraint system of claim 29, wherein said actuating lever includes a projecting arm for engaging said stop.

* * * * *